C. C. JOHNSON AND R. M. HOPKINS.
REGISTRY APPARATUS.
APPLICATION FILED JAN. 23, 1920.
1,394,840.
Patented Oct. 25, 1921.
5 SHEETS—SHEET 1.
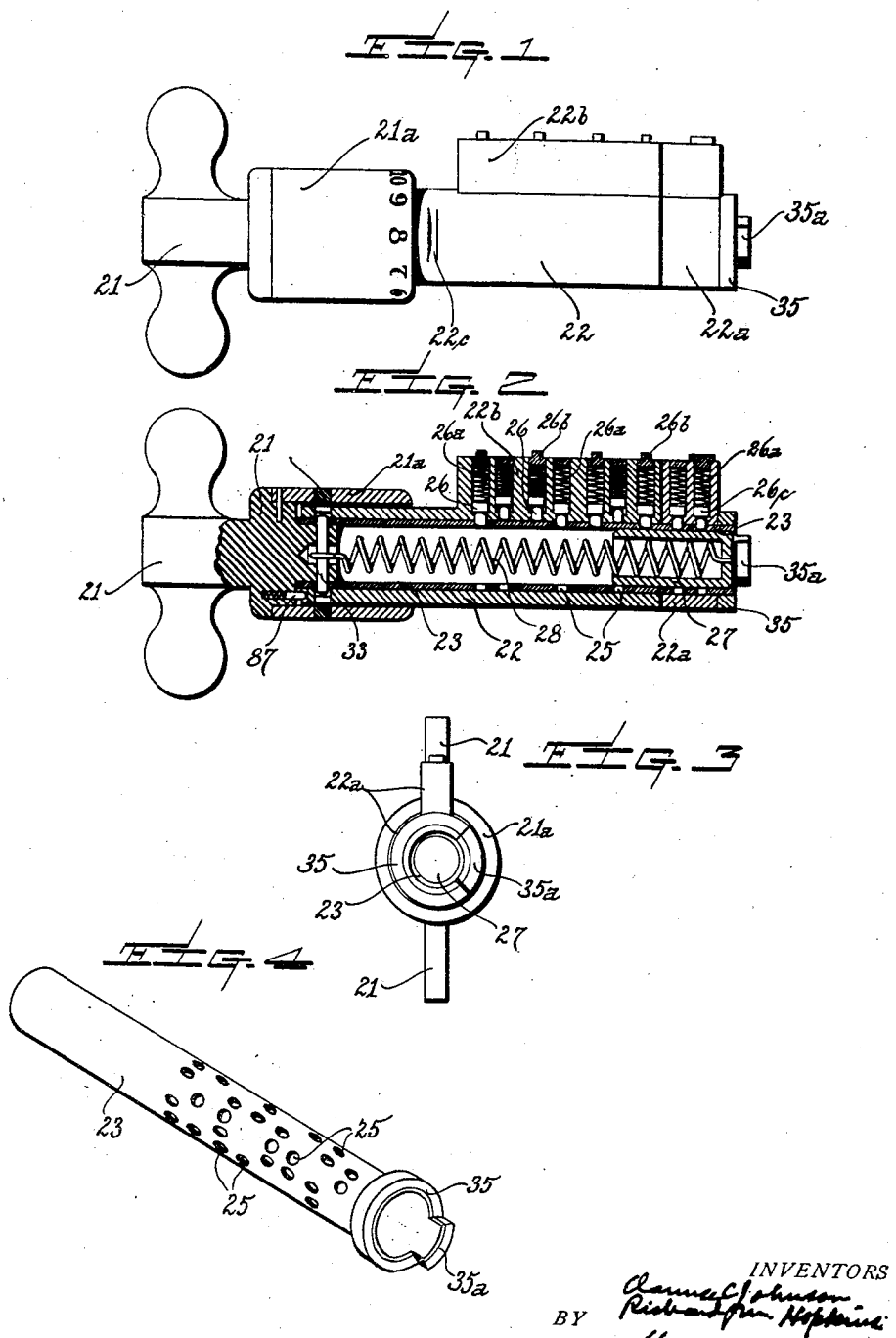
INVENTORS
Clarence C. Johnson
Richard M. Hopkins
BY H. M. Marble
ATTORNEY C. C. JOHNSON AND R. M. HOPKINS.
REGISTRY APPARATUS.
APPLICATION FILED JAN. 23, 1920.

1,394,840.

Patented Oct. 25, 1921.
5 SHEETS—SHEET 2.

INVENTORS
Clarence C. Johnson
Richard M. Hopkins
BY
H. M. Marble
ATTORNEY.

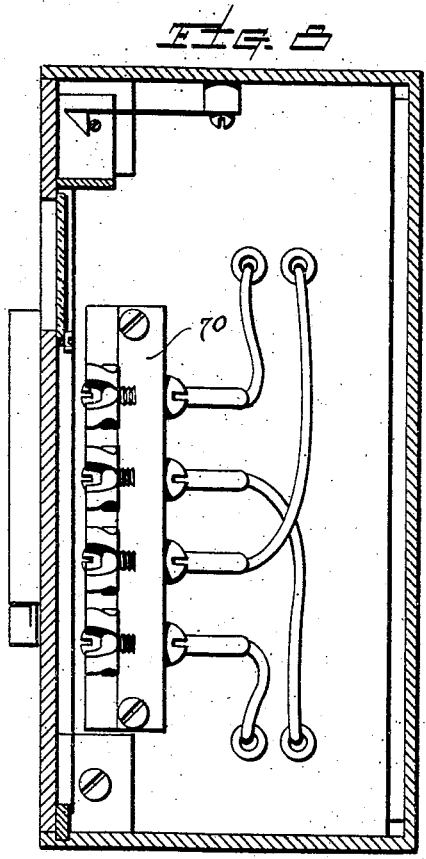

C. C. JOHNSON AND R. M. HOPKINS.
REGISTRY APPARATUS.
APPLICATION FILED JAN. 23, 1920.
1,394,840.
Patented Oct. 25, 1921.
5 SHEETS—SHEET 4.
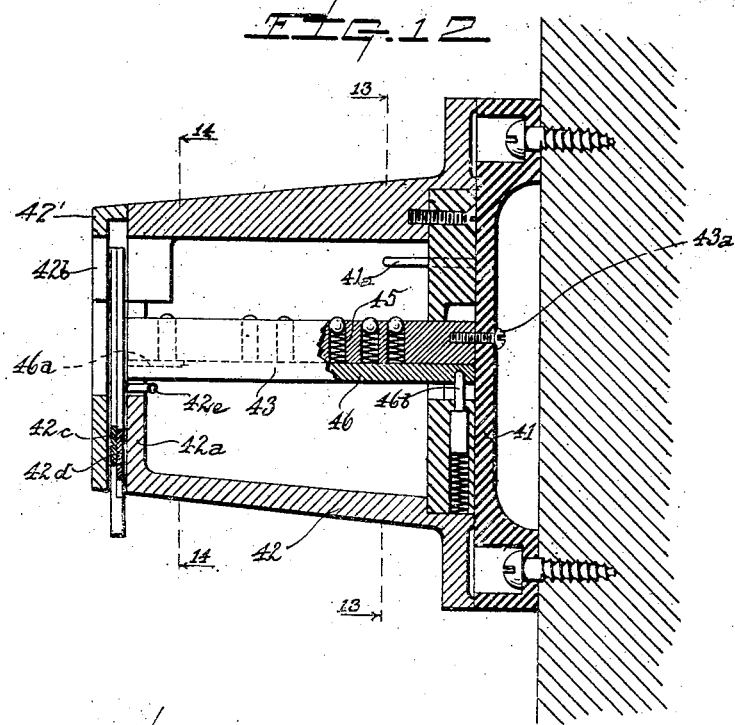
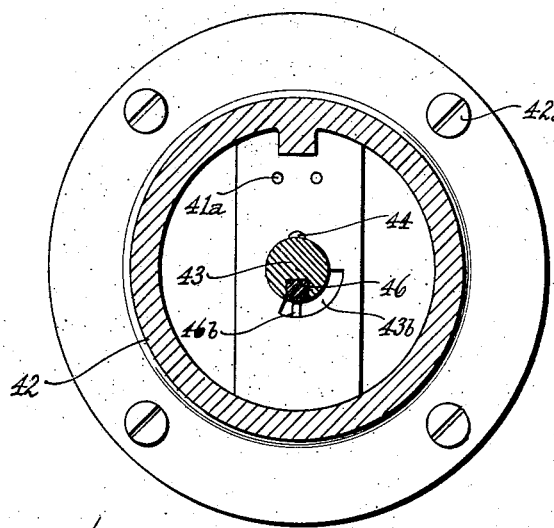
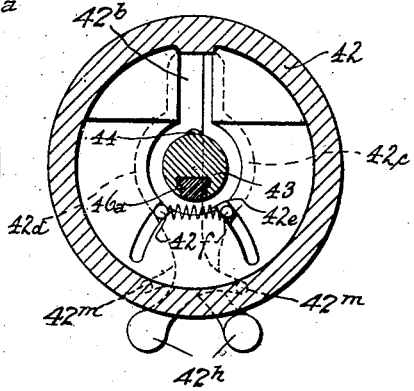
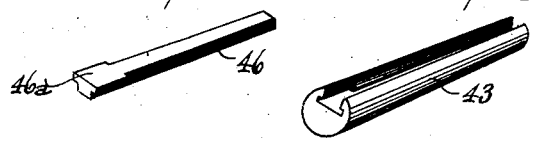
INVENTORS
Clarence C. Johnson
Richard M. Hopkins
BY
ATTORNEY C. C. JOHNSON AND R. M. HOPKINS.
REGISTRY APPARATUS.
APPLICATION FILED JAN. 23, 1920.
1,394,840.
Patented Oct. 25, 1921.
5 SHEETS—SHEET 5.
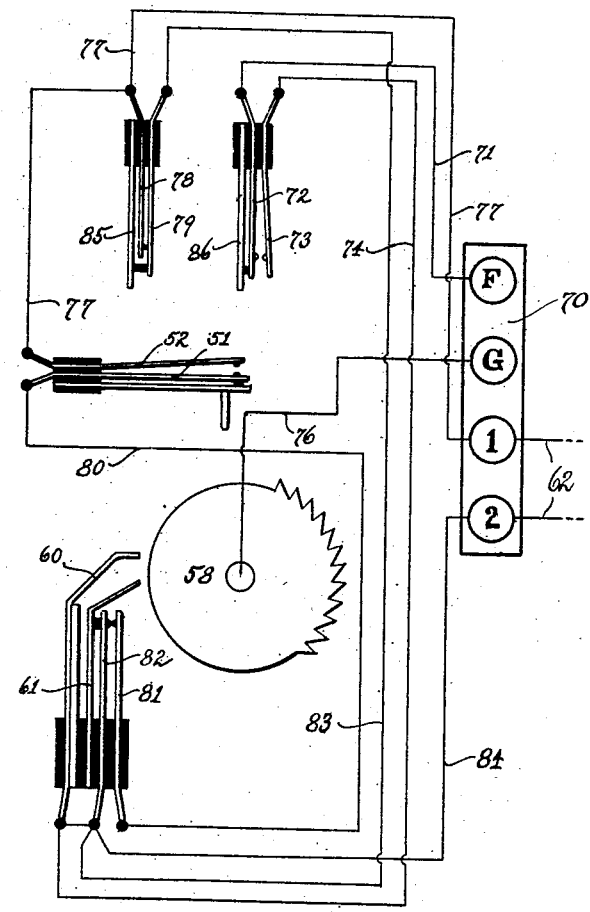
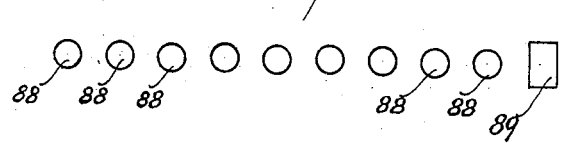
INVENTORS.
Clarence C. Johnson
Richard M. Hopkins
BY
ATTORNEY.

# UNITED STATES PATENT OFFICE.

CLARENCE C. JOHNSON, OF METUCHEN, AND RICHARD M. HOPKINS, OF RUTHERFORD, NEW JERSEY, ASSIGNORS TO AMERICAN DISTRICT TELEGRAPH COMPANY, OF JERSEY CITY, NEW JERSEY, A CORPORATION OF NEW JERSEY.

REGISTRY APPARATUS.

1,394,840.

Specification of Letters Patent.

Patented Oct. 25, 1921.

Application filed January 23, 1920. Serial No. 353,601.

*To all whom it may concern:*

Be it known that we, CLARENCE C. JOHNSON and RICHARD M. HOPKINS, citizens of the United States of America, and residents of Metuchen, Middlesex county, New Jersey, and Rutherford, Bergen county, New Jersey, respectively, have invented certain new and useful Improvements in Registry Apparatus, of which the following is a specification.

Our invention relates to improvements in watchmen's registry systems and apparatus therefor, and embodies improvements in the system for the same purpose set forth in the application of C. C. Johnson Serial No. 209,279, filed December 28, 1917, and in our application filed June 12, 1919, Serial No. 303,593. By the term watchmen's registry system is meant a system in which the visits of watchmen to certain stations which they are supposed to visit regularly, are registered. According to the systems of said applications, the watchman is provided with a portable register having registering mechanism adapted to be advanced step-by-step upon application to suitable station devices located at the various stations which the watchman is supposed to visit, one advance for each station; but this registry mechanism is normally locked, and cannot be actuated except and until the watchman applies his register to the said station device or "conditioning device." When the register has been applied to such a key device, then and only then, the watchman may actuate the registering mechanism and so register his visit to that particular station. The several key devices are preferably provided with means whereby they are differentiated one from another, and the mechanism of the register is such that actuation of the registering mechanism at one station conditions that mechanism for actuation at the key device or station device of the next station of the series, and for actuation at that next key device only. In this way the watchman is compelled to visit the several stations in regular order, and cannot continue to actuate his registering mechanism if he omit any station in making his tour, or if he visit stations out of order. At one or more points or stations of the tour, suitable transmitting mechanism is provided, preferably as a part of the station device or "conditioning device" of that station; the arrangement being such that when the watchman visits that transmitting station and actuates his register, he also transmits a signal to some central station. Since the watchman can actuate his register at the transmitting station, only in the event that he has properly actuated his register at all the preceding stations of the series, the transmission of the signal from that transmitting station is evidence that he has visited all of the preceding stations; and in this way it is rendered unnecessary for the watchman to signal separately to the central station for his visits to the stations other than those at which the transmitters are located.

The apparatus herein illustrated and described is of the general type particularly shown in the said Johnson and Hopkins application, Serial No. 303,593, but involves certain improvements in construction, in protective features, and in other respects, all as hereinafter pointed out.

The object of our present invention is to improve and simplify the mechanism of systems such as referred to, to increase the degree of protection afforded, and in particular to make yet more difficult tampering with the mechanism. Other objects of our invention will be pointed out hereafter.

We will now proceed to describe our invention with reference to the accompanying drawings, and will then point out the novel features in claims:

Figure 1 shows a side elevation of our improved register, and Fig. 2 a central vertical section thereof.

Fig. 3 shows an end view of the register, and Fig. 4 a perspective elevation of the perforate tumbler-engaging sleeve.

Fig. 8 shows an end elevation of the contact block and associated parts, the casing being shown in section.

Fig. 9 shows a detail side view, looking from the right of Fig. 5 of the register-receiving stem, and certain contact devices, the casing of the mechanism being shown in section.

Fig. 10 shows a fragmentary front view of the transmitter box, closed, and shows in particular the shutter normally closing the opening through which the register is inserted.

Fig. 11 shows a side elevation of the transmitter itself, looking from the left of Fig. 5.

Fig. 12 shows a central vertical section of one of the non-transmitter station devices or key devices;

Figure 5:
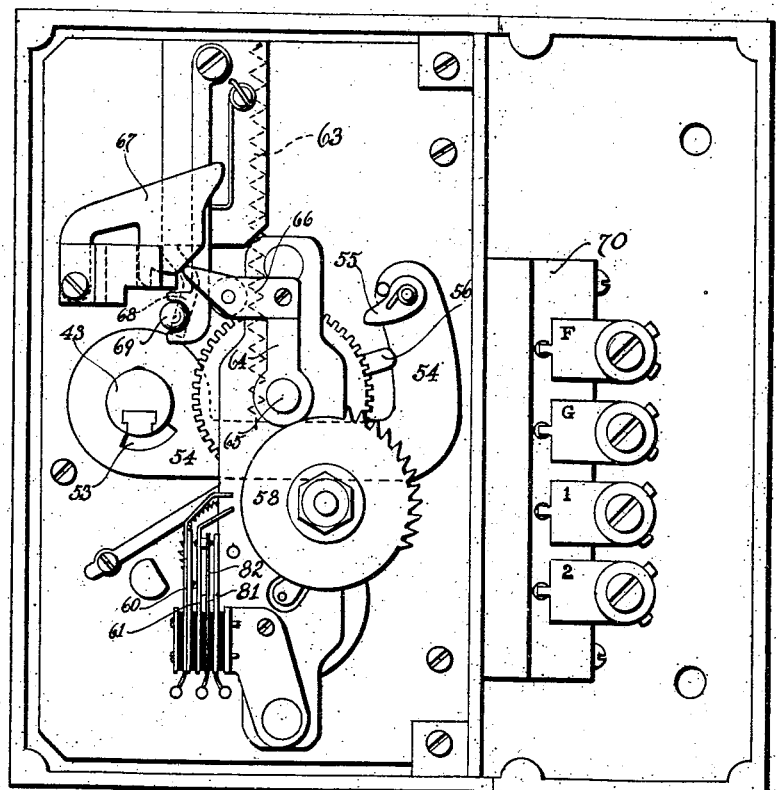
Fig. 5 shows a front elevation of a combined key device and transmitter, one or more of which are customarily provided in the series of stations to be visited; in this view the cover of the inclosing casing having been removed.
Figure 6:
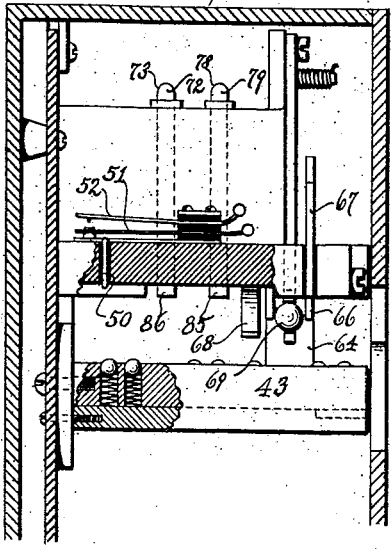
Fig. 6 shows a side elevation and partial section of the said combined key device and transmitter, the casing of the transmitter being also shown in section.
Figure 7:
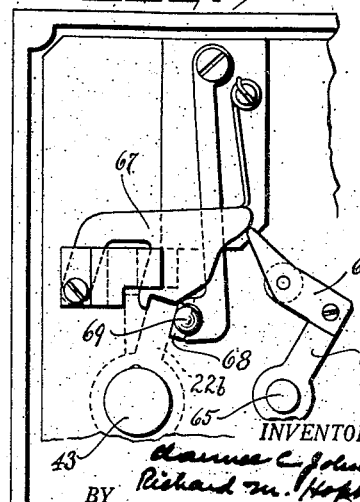
Fig. 7 shows a fragmentary front elevation of the mechanism which locks the register in the fully-wound position, the register itself being there indicated in dotted lines.

Fig. 13 shows a transverse vertical section of this station device on the line 13—13 of Fig. 12; and Fig. 14 shows a vertical section of the station device on the line 14—14 of Fig. 12, and in particular shows the shutter which normally closes the opening through which the register may be inserted. Fig. 14$^a$ is a detail perspective view of the tumbler retainer, and Fig. 14$^b$ an inverted perspective view of the tumbler-carrying stem.

Fig. 15 is a diagram of the electrical connections of the transmitter station device; and Fig. 16 is a diagram illustrative of the arrangement of transmitting and non-transmitting stations.

Referring first to Figs. 1 to 4 inclusive, illustrating the register itself. This instrument has somewhat of the appearance of a key of massive proportions, but is more than a key, having registering mechanism within it, together with means for actuating that mechanism. Externally, the principal visible parts of the register are, a two-part handle portion 21—21$^a$ pinned together so as to be in effect one part; a tumbler-carrying shank 22; and another tumbler-carrying sleeve 22$^a$. Internally, the register comprises a tubular member 23, perforated as hereinafter described, for engagement with the tumblers hereinafter mentioned, and on which sleeve the members 22 and 22$^a$ are mounted. A pin 33 connects members 23 and 21. Member 22 is provided with a projecting lug 22$^b$ in which are a series of spring-pressed plungers or tumblers 26, each such tumbler being located in an individual socket of the lug 22$^b$ and having behind it an actuating spring 26$^a$, and, behind that spring, a socket-closing plug 26$^b$. The second tumbler-carrier, 22$^a$, has corresponding tumblers, 26$^c$, actuating springs therefor, and closing plugs. The pin tumblers, of course, are adapted to engage the tumbler-holes 25 of the sleeve 23, but have heads by which they are restrained from passing completely through said holes. Within sleeve 23 there is a sliding piston-like guard 27, normally pressed out by a spring 28. This guard 27 not only tends to prevent entry of dust and the like into the register, but makes extremely difficult attempts to tamper with the tumblers from the end of the register. At the extreme end of the sleeve 23 there is a stop-collar 35 secured to sleeve 23 in such manner as to be in effect a fixed part thereof; this stop collar not only retains member 22$^a$ in place on sleeve 23, but has a projection 35$^a$ the function of which will be explained hereafter.

The spring 28 is fastened at one end to the sliding guard 27, and at the other end to the handle 21.

As will be apparent from Fig. 4, the sleeve 23 is provided with perforations arranged in rows, and these perforations are arranged in different combinations in the different rows, so that in one position of the sleeve a certain combination of tumblers 26 will engage perforations of that sleeve, and in another position of the sleeve a different combination of plungers 26 will engage perforations of the sleeve. For each of these various positions of the sleeve 23 at least one of the tumblers 26$^c$ should engage a perforation of that sleeve.

As above implied, the register above described is intended for use with a number of station devices, key devices, or conditioning devices, as the said devices are variously termed. The ordinary or non-transmitting station device is indicated in Figs. 12 to 14, and comprises a base 41, adapted to be secured to a wall or other support, and a shell or casing 42, together with a central stem or tumbler-carrier 43, having sockets at suitably-spaced intervals for spring-pressed ball tumblers 44. The sockets 45, in which these ball tumblers are located, are slightly closed at their outer ends, so as to prevent the escape of the ball tumblers. Behind the springs of these ball tumblers there is a retaining-bar 46 fitting loosely in a slot of the stem 43 except as to be now stated. At its front end this bar 46 has a short flanged head-portion 46$^a$ fitting within a correspondingly formed slot of the stem 43. At its rear end the retaining bar 46 is held in place normally by a spring-pressed plunger 46$^b$. The purpose of this construction is to cause the ball-tumblers 44 and their springs to fall out and scatter in case any attempt be made to tamper with the key device by removing the shell 42. As shown this shell 42 is held to the base 41 by external screws 42$^a$, which, of course, are easy to remove. Suppose these screws are removed, and the shell 42 is pulled away from the base 41. The tumbler-carrying bar 43, being secured to the base 41 by a screw 43$^a$ entering from the back of that base, that tumbler-carrier will remain in place when the shell 42 is removed; and as the shell 42 is pulled away the tumbler-retainer 46 will also be pulled away from the stem 43, owing to the engagement with this tumbler-retainer 46 of the spring-pressed plunger 46$^b$ carried by the shell 42. As the shell 42 is pulled away, since the tumbler-retainer moves with it, the various tumbler-sockets in stem 43 are uncovered and the tumblers and springs therein fall out; and once this has occurred, it is practically impossible to replace them since the stem 43 itself cannot well be removed, since it is secured to the base 41 by a screw 43$^a$ entering that stem from the rear, this screw 43$^a$ being therefore inaccessible.

In practice some of the possible tumbler sockets of the carrier 43 are omitted in each key device, and each key device of the series has a different combination of tumblers from all the other key devices of the system, the tumbler combination of each key device of the system corresponding to a corresponding row of perforations of the sleeve 23 of the register.

At its front, the shell 42 is closed by an end portion 42′ in which is a slot 42$^b$ for the reception of the lugs 22$^b$ of the register. This slot therefore compels the insertion of the register into the key device in a definite position. For the protection of the contents of the shell from the weather, dust, etc., a shutter is provided consisting of two leaves 42$^c$ and 42$^d$, pivoted to the shell at 42$^m$, guided by pins 42$^f$ working in slots 42$^g$ and normally drawn together by a spring 42$^e$. These shutter leaves are provided with external handles 42$^h$ which the watchman may press together, so separating the shutter leaves and permitting the entry of the register into the station device. At the base of the tumbler carrier 43 of the station device there is a segmental slot 43$^b$ adapted to be engaged by the stop 35$^a$ of the register, above mentioned. This slot limits the rotative motion of the register within the station device.

The operation of the register at one of these station devices is as follows: The watchman, having reached the station device, actuates the shutter thereof, to permit the insertion of the register into that station device, and then inserts the register over the stem 43 as far as it may go; the guard 27 being pushed back as the stem enters the register. Having done this he rotates the handle 21 of the register through the angle permitted by the slot 43$^b$. Of course he may rotate that handle only in the event that the ball tumblers 44 of the station device have engaged all of the pin tumblers 26 of the register which have been in engagement with perforations of the sleeve 23, and so have pressed all of such tumblers 26 out of engagement with the sleeve 23; in other words, the register can be actuated at any of the station devices only when the tumbler combination of that station device agrees with the tumbler combination which previously has held sleeve 23 locked. Rotation of the shank 22 of the register when the handle 21 of that register is so rotated is prevented by engagement of the projecting lug 22$^b$ of the register with the slot 42$^b$ of the station device. Rotation of the tumbler carrier 22$^a$ of the register is prevented, at this time, by engagement of pins 41$^a$ projecting from base 41 with the sides of the projecting tumbler-carrying lug of member 22$^a$.

The watchman, having so actuated his register, withdraws it from the station device, and as he does so a new combination of tumblers 26 engage the corresponding combination of perforations of the sleeve 23, so locking that sleeve against further rotation until the next station device is visited and the register properly actuated thereat.

As previously explained, it is intended that the watchman, during his round, shall at some one station at least transmit a characteristic signal to some central station or point from which supervision is exercised, or at which a record is made of his signals; thereby in effect registration of the watchman's visits to the several stations is transfered from the register to the central station. Therefore, at one or more key-stations of the series, transmitting mechanism is provided. Figs. 5 to 11 inclusive ilustrate a station provided with such a transmitting device. The transmitting station comprises a register-receiving tumbler-carrying stem 43 similar to the corresponding stem of the non-transmitting stations, and, of course, provided with tumblers corresponding to the tumblers 26 of the register which should be presented to the tumblers of the stem 43 when the register is passed over that stem.

When the register is inserted at this transmitting station and pressed home over the tumbler carrier 43, the first effect is that the top of one of the socket-closing plugs 26$^b$ of member 22$^a$ engages a pin 50 of a contact device 51—52, closing that contact. The end lug 35$^a$ of the register engages in a slot 53 of a lever 54, so that, when the register is turned at this transmitter station, as it is turned at the other stations of the series, lever 54 is actuated. This lever 54 carries a spring-actuated pivoted pawl 55 adapted to engage the spring winding lever 56 of the clock-mechanism of a transmitter, forming a part of the station mechanism, as hereinafter described. For a time after the rotation of the register, there is no engagement between pawl 55 and spring winding lever 56. At the non-transmitting stations, the register is turned only a distance sufficient to bring the next row of perforations of sleeve 23 opposite the tumblers; but at this transmitting station the register is turned further, with the result that pawl 55, engaging spring winding lever 56, is moved far enough to wind up the spring 57 of the clock train of the transmitter. The movement of lever 56 continues in this manner until finally a point is reached where said lever will slip past the end of pawl 55, whereupon that lever will begin to return, under the influence of spring 57, the spring then driving, in the usual manner, the break wheel 58, through the usual gear train 59; and as this occurs the teeth of the break wheel will actuate the contact pens 60 and 61, so transmitting the signal of the break wheel through the signal circuit 62, in the usual manner. The particular arrangement of contact springs, in connection with pens 60 and 61, is an arrangement designed to give transmission according to the well known McCulloh system, and forms the subject matter of an application filed by R. M. Hopkins on October 10, 1919, Serial No. 329,730. But since any suitable transmitting arrangement may be employed, we do not deem it necessary to describe the particular arrangement of transmitting contacts here. A spring 63 tends to return lever 54, and will do so when the register is turned back, as hereinafter described; and in such upward movement of the lever 54, the pawl 55 yields to permit its passage past the end of lever 56, and then, after such passage, springs back to the position shown.

When the register is turned for the winding of the transmitter spring 57, a lever 64 on the same shaft 65 with lever 56 is turned to the right (Fig. 5) carrying with it a projection 66 in engagement at that time with the edge of a pivoted cam 67. As the register is turned for the winding of the transmitter spring, lever 64 is of course turned back or to the right of Fig. 5, and as it does so cam 67 falls, until, when the register has been turned sufficiently far and is arrested by a stop 68, cam 67 drops behind the lug 22$^b$ of the register, locking that register against return while the transmitter is sending its signal. After the register has completed the transmission of its signal, the projection 66 engages and lifts the cam 67 and the register is then turned back to position for withdrawal by a spring-actuated member 69, and by the pressure of lever 66, as hereinafter described.

The various line and ground wires are led into the case, through a suitable hole therein, not shown, and are connected to terminals on the terminal block 70 (Fig 5). From the terminal marked F, a wire 71 (Fig 15) leads to one of two spring contacts 72 and 73, normally separated, and from spring 73 a wire 74 leads to the ground-pen 60 of the transmitter. The break wheel 58 of the transmitter is connected by wire 76 to ground terminal G.

The line terminal 1 is connected by the wire 77 to one of two contact springs 78 and 79, which are normally in contact, wire 77 continuing to another of two contact springs 52 and 51, normally out of contact. Spring 51 is connected by wire 80 to one of the two contact springs 81 and 82 of pen 61.

It has already been explained that when the register is introduced into the transmitting station device, it closes contact between springs 51 and 52, the effect of which is, it will be seen, to close the internal transmitter circuit leading from terminal 1 to terminal 2. This internal transmitter circuit remains closed while the register is in place in the transmitter station device, and this indeed is the reason why the register is provided with two separate tumbler-carrying members 22 and 22$^a$; for it is member 22$^a$ which closes these contacts 51 and 52, and it is not desired that the portion of the register which holds such contacts 51 and 52 closed shall move during the turning of the register to effect registration and to effect operation of the transmitter.

Contacts 78 and 79 normally close a shunt across line terminals 1 and 2 (spring 79 being connected by a wire 83 to spring 82 and thence by wire 84 to terminal 2) and therefore these contacts 78 and 79 maintain the line circuit closed so far as the transmitter station device is concerned, when the register is not in place in the transmitter station device. Similarly contact springs 72 and 73 maintain the ground connection of the transmitter open when the register is not in place in the transmitter station device. Contacts 78—79 are opened, and contacts 72—73 are closed, by engagement of the side of lug 22$^b$ of the register with the corresponding actuating members 85 and 86 when, after the register handle, having been turned far enough to cause the register tumblers to engage a new set of perforations of sleeve 23, that handle is turned still farther to wind the transmitter, and, eventually, to cause the transmitter to operate.

It will be seen, therefore, that the effect of the introduction of the register into the transmitting station device, is, first, by the closing of contact between springs 51 and 52, to close the internal circuit of the transmitter; these contacts being provided mainly as a more or less secretive feature of the apparatus; that the first effect of the operation of the register within the transmitter station device is to register the visit of the watchman at that station; the further effect of the turning of the register handle being the breaking of the line shunt at contacts 78 and 79 and the closing of the line circuit at contacts 72 and 73, preparatory to the operation of the transmitter.

A ratchet connection is provided between the handle 21 of the register and the shank 22, such ratchet connection consisting of a spring-actuated ratchet pin 87 engaging a ratchet tooth in the end of the shank 22; this ratchet being provided to prevent backward rotation of the handle 21 with reference to the shank 22 when the register is being actuated at one of the non-transmitting stations immediately following one of the transmitting stations; for if the watchman could turn his handle backward with reference to the shank, at a non-transmitting station following a transmitting station, he could thereby possibly condition his register such that he could immediately return to the said transmitting station and again send a signal, so saving himself a complete tour.

The following additional features in connection with the operation of the register and mechanism of the transmitting station devices, are also to be noted:

The lever 68 has, it will be noted, a ball-end 69 which engages the side of the lug 22$^b$ of the register, once that register has been inserted into the transmitting station device, so that the stiff spring of this lever 68 resists rotary motion of the sleeve 22 of the register. This is important, in that it is important that the first rotary motion of the handle 21 of the register shall cause registering motion of the sleeve 23 of the register.

Assuming for illustration that the register is adapted for operation at ten stations (the number may be greater or less than ten stations, ten being selected here for illustration), when the handle 21 has been rotated (when the register is at the transmitter station) through somewhat more than one-tenth of a rotation, the ratchet pin 87 of the register (Fig. 2) has engaged a new tooth of the sleeve 22, so that the watchman cannot then turn back the handle 21, and so restore his register to a condition such as if he had again made his complete tour. The sleeve 22, and with it its lug 22$^b$, is now rotating as the handle 21 is turned, and the cam 67 drops behind one of the projecting lugs 26$^b$ of the register, preventing return motion of the register before the transmitter has been wound, and before lever 56 has slipped past the end of pawl 55. In a word, the watchman cannot withdraw his register from a station device until he has wound the transmitter completely. He must, therefore, continue the turning of the handle 21 until the transmitter is fully wound. As he does so, the cam 67 engages with the body of lug 22$^b$ (whereas before it has been in engagement only with one of the projecting lugs 26$^b$ of main lug 22$^b$, the cam 27 still acting, as will be apparent, to prevent backward rotation of the register). When the transmitter has been fully wound, and the lever 56 has slipped past the pawl 55, so that the transmitter is running after having been fully wound, the projection 66 of lever 64 engages and lifts the cam 67 and the register is then rotated back to its initial or entrance position by members 69 and 66, as previously described.

The register is provided on its side with a notch 22$^c$ which is engaged by one of the two shutter blades 42$^c$ and 42$^d$ of the transmitter station device, and thereby the register is held in its fully wound position while it is being rotated in that station device.

In Fig. 16 we have illustrated diagrammatically a series of transmitting and non-transmitting stations such as herein referred to as constituting a watchman's tour, 88 designating the non-transmitting stations and 89 a transmitting station. The transmitting station may be placed anywhere in the tour, but in most cases is located most conveniently at one end of the tour, as shown.

The particular construction of key device, or station device, illustrated in Figs. 12—14$^b$ inclusive is the invention of Mr. Hopkins of the joint inventors herein, and forms the subject matter of a separate application Serial No. 353,458.

What we claim is:—

1. In a register, the combination of a hollow register-shank provided with a series of tumbler-receiving means, a rotatable perforate sleeve within said shank having a plurality of series of perforations, the perforations of each such series corresponding to a tumbler combination different from the perforations of each of the other series, and tumblers in said receiving means adapted to engage the perforations of said sleeve.

2. In a register, the combination of a hollow register-shank provided with a projecting lug having within it a series of tumbler-receiving means, a rotatable perforate sleeve within said shank having a plurality of series of perforations, the perforations of each such series corresponding to a tumbler combination different from the perforations of each of the other series, the tumblers in said receiving means adapted to engage the perforations of said sleeve.

3. In a register, the combination of a hollow register-shank provided with a series of tumbler-receiving means, a rotatable perforate sleeve within said shank having a plurality of series of perforations, a further tumbler-carrier rotatably mounted with respect to said sleeve, and tumblers in said receiving means of the shank and of the separate tumbler-carrier adapted to engage the perforations of said sleeve, each series of such perforations of said sleeves corresponding to a tumbler combination different from the perforations of each of the other series.

4. In a register, the combination of a hollow register-shank provided with a series of tumbler-receiving means, a rotatable perforate sleeve within said shank having a plurality of series of perforations corresponding to different tumbler-combinations, tumblers in said receiving means adapted to engage the perforations of such sleeve, and a handle in fixed connection with said sleeve and in rotatable connection with said shank.

5. In a register, the combination of a hollow register-shank provided with a series of tumbler-receiving means, a rotatable perforate sleeve within said shank having a plurality of series of perforations corresponding to different tumbler-combinations, tumblers in said receiving means adapted to engage the perforations of such sleeve, and a handle in fixed connection with said sleeve and in rotatable connection with said shank.

6. A combined key-device and signal transmitter for registers such as described, comprising a stem adapted to be engaged by the register and having tumblers adapted to coact with corresponding register-tumblers when the register and stem are engaged, signal transmitting means comprising a windable driving device and means adapted to be engaged by the register when in place on said stem, and adapted to be actuated by movement of the register after the latter is in place on said stem, for winding the said driving means of the transmitter.

7. A combined key-device and signal transmitter for registers such as described, comprising a stem adapted to be engaged by the register and having tumblers adapted to coact with the corresponding register-tumblers when the register and stem are engaged, signal transmitting means comprising a windable driving device and means adapted to be engaged by the register when in place on said stem, and adapted to be actuated by movement of the register after the latter is in place on said stem, for winding the said driving means of the transmitter, said winding means comprising means adapted to engage and actuate the windable driving device of the transmitter in one direction of movement of said winding means, and then to disengage said windable driving device to permit operation of the transmitter, and on return movement of said winding means to pass the windable driving device without operating the latter.

8. A combined key device and signal transmitter for registers such as described, comprising a stem adapted to be engaged by the register and having tumblers adapted to coact with corresponding register-tumblers when the register and stem are engaged, signal transmitting means comprising a windable driving device having a winding lever, means adapted to be engaged by the register when in place on said stem, and adapted to be actuated by movement of the register after the latter is in place on said stem, for winding the said driving means of the transmitter, said winding means comprising a spring-actuated pawl adapted, in one direction of movement of said winding means to engage said winding lever and actuate the same and then to disengage said lever to permit operation of the transmitter, and further adapted on return movement of said winding means to pass said lever without operation of the latter.

9. A transmitter comprising key-receiving means, signal transmitting means comprising a windable driving device, a lever adapted to be engaged by a suitable key when the latter is in place on said key-receiving means and to be actuated by movement of the key to engage and actuate the windable driving device of the transmitter and then to disengage said windable driving device to permit operation of the transmitter, and on return movement of said winding means to pass the said windable driving device without operating the latter.

10. In a registry system the combination of a combined key device and signal transmitter having a register-receiving member and a register adapted to engage said register-receiving member, said register comprising registering means and controlling tumblers therefor adapted to be actuated in various combinations, said register-receiving means comprising means for actuating a proper tumbler combination of the register, said signal transmitter having transmitting means comprising a windable driving device and means adapted to be engaged by the register when in place on said register receiving means, and adapted to be actuated by movement of the register after the latter is in place on said register-receiving means, for winding the said driving means of the transmitter.

11. In a registry system, the combination of a combined key device and signal transmitter having a register-receiving stem, and a register adapted to engage said stem, said register comprising registering means and controlling tumblers therefor adapted to be actuated in various combinations, said stem comprising means for actuating a proper tumbler combination of the register, said signal transmitter having transmitting means comprising a windable driving device and means adapted to be engaged by the register when in place on said stem and adapted to be actuated by movement of the register after the latter is in place on said stem, for winding the said driving means of the transmitter.

12. In a registry system, the combination of a register and a combined key device and signal transmitter for that register, the register comprising a series of tumblers and tumbler-engaging means adapted to engage the tumblers in different combinations in different positions of the tumbler-engaging means with respect to said tumblers, and further comprising means for moving the tumbler-engaging means with respect to said tumblers step by step, the combined key device and transmitter comprising register receiving means having means for actuating a proper combination of said tumblers, when the register is in place on said tumbler receiving means, said register further comprising means for actuating the transmitter when the register tumblers have been properly actuated by the register receiving means.

13. In a registry system, the combination of a register and a combined key device and signal transmitter for that register, the register comprising a series of tumblers and tumbler-engaging means adapted to engage the tumblers in different combinations in different positions of the tumbler-engaging means with respect to said tumblers, and further comprising means for moving said tumbler engaging means with respect to said tumblers step by step, the combined key device and transmitter comprising a register-receiving means having means for actuating a proper combination of tumblers when the register is in place on said tumbler receiving means, said register further comprising means for actuating the transmitter when the register tumblers have been properly actuated by the register-receiving means.

14. In a registry system, the combination of a register and a combined key device and signal transmitter for that register, said signal transmitter comprising key-operated windable signal transmitting means, the register comprising registering means and locking means controlling the same, the key device comprising means for operating said locking means to release the registering means when the register and key device are properly engaged, the register adapted to serve as a winding means for said transmitter when its registering means has been released by the action of said key device.

15. In a registry system, the combination of a register and combined key device and signal transmitter for that register, said signal transmitter comprising key-operated windable signal transmitting means, the register comprising registering means and controlling tumblers therefor adapted to be actuated in various combinations, the key device comprising means for actuating a proper tumbler-combination of the register, the register adapted to serve as a winding means for said transmitter when its registering means has been released by the action of said key device.

16. In a registry system, the combination of a register and a combined key device and signal transmitter for that register, said signal transmitter comprising key-operated windable signal transmitting means, the register comprising a hollow register-shank provided with a series of tumbler-receiving means and comprising also a rotatable perforate sleeve within said shank having a series of tumbler-engaging perforations corresponding to different tumbler-combinations, the register further comprising tumblers in said receiving means adapted to engage the perforations of said sleeve, the key device comprising a stem adapted to receive the sleeve of the register and having means to actuate a proper combination of register tumblers to release the said register sleeve, the register comprising means whereby that register may engage and operate as a key the said transmitter when its sleeve is so released.

17. In a registry system, the combination of a register and a combined key device and signal transmitter for that register, said signal transmitter comprising key-operated windable signal transmitting means, the register comprising a hollow register-shank provided with a series of tumbler-receiving means and comprising also a rotatable perforate sleeve within said shank having a series of tumbler-engaging perforations corresponding to different tumbler-combinations, the register further comprising tumblers in said receiving means adapted to engage the perforations of said sleeve, the key device comprising a stem adapted to receive the sleeve of the register and having means to actuate a proper combination of register tumblers to release the said register sleeve, the signal transmitter having rotatable winding means adapted to be engaged by the end of said register sleeve, and said register sleeve having at its end means to engage said winding lever whereby the register may serve as a winding key for the transmitter.

18. In a registry system, the combination of a register, and a combined key device and signal transmitter for that register, said register comprising registering means adapted to register successive actuations, and comprising also locking means normally locking said registering mechanism against actuation, said transmitter comprising two coöperating winding members, said key device comprising means for releasing the locking means of the register, said register adapted to actuate one of said winding means of the transmitter as a key, said two coöperating winding means arranged to be engaged to wind the trnsmitter by continued actuation of the register after registration has been effected.

19. In a registry system, the combination of a register, and a combined key device and signal transmitter for that register, said register comprising registering means adapted to register successive actuations, and comprising also locking means normally locking said registering mechanism against actuation, said transmitter comprising two coöperating winding members, said key device comprising means for releasing the locking means of the register, said register adapted to actuate one of said winding means of the transmitter as a key, said two coöperating winding means arranged to be engaged to wind the transmitter by continued actuation of the register after registration has been effected.

20. In a registry system, the combination of a register, and a combined key device and a signal transmitter for that register, said register comprising registering means adapted to register by successive actuations, and comprising also locking means normally locking said registering mechanism against actuation, said transmitter comprising two coöperating winding members, said key device comprising means for releasing the locking means of the register, said register adapted to actuate one of said winding means of the transmitter as a key, said two coöperating winding means arranged to be engaged to wind the transmitter by continued actuation of the register after registration has been effected.

21. In a registry system, the combination of a register and a combined key device and signal transmitter for that register, said signal transmitter comprising a winding member and an operating arm adapted to engage said winding member but normally disengaged therefrom, and adapted to be engaged by the register as a key for operating the transmitter, said register comprising registering means adapted to be advanced step by step, and comprising also locking means normally locking said registering means and further comprising means to engage as a key the said transmitter operating arm, the key device comprising means for releasing the locking means of the transmitter, said operating means of the transmitter arranged to engage the winding means of that transmitter after the register has been moved, as a key for the transmitter, beyond the space corresponding to a proper registry actuation.

22. In a transmitter adapted for actuation by a removable key, the combination of key-receiving means, windable transmitter-operating means adapted to be engaged and operated by a key on said key receiving means, a cam adapted to move to engage such key when the latter has operated said winding means, and means operated by said winding means normally holding said cam out of position to engage said key but arranged to permit such cam to move to such engaging position as the transmitter is being wound, and to move such cam out of such engaging position as the transmitter operates.

23. In a transmitter adapted for actuation by a removable key, the combination of key-receiving means, windable transmitter-operating means adapted to be engaged and operated by a key on said key receiving means, a cam adapted to move to engage such key when the latter has operated said winding means, means operated by said winding means normally holding said cam out of position to engage said key but arranged to permit such cam to move to such engaging position as the transmitter is being wound, and to move such cam out of such engaging position as the transmitter operates, and means for throwing back the key after the transmitter has operated.

24. In a registry system, the combination of a register having two projecting tumbler-carrying means, one fixed with respect to the body of the register and the other rotatable thereon, tumblers for said tumbler-carrying means and means to be alternatively engaged and disengaged by said tumblers, a combined key device and transmitter having register receiving means adapted to receive the said register and to disengage the engaged tumblers thereof, said transmitter having transmitter-winding means arranged to be engaged by said register and operated by movement thereof when in place on said register receiving means, and contact means for the circuit of said transmitter arranged to be closed by movement of the register when in place on said register receiving means.

25. In a registry system, the combination of a register having two projecting tumbler-carrying means, one fixed with respect to the body of the register and the other rotatable thereon, tumblers for said tumbler-carrying means and means to be alternatively engaged and disengaged by said tumblers, a combined key device and transmitter having register receiving means adapted to receive the said register and to disengage the engaged tumblers thereof, said transmitter having transmitter-winding means arranged to be engaged by said register and operated by movement thereof when in place on said register receiving means, contact means for the circuit of said transmitter arranged to be closed by movement of the register when in place on said register receiving means, a further contact for the circuits of said transmitter closed by the movable tumbler-carrying means of the register when the register is in place on said register receiving means, and means for holding said movable tumbler carrying means stationary during motion of the register to effect winding of the transmitter.

26. In a registry system, the combination of a register, and a key device for that register comprising a casing into which the register may be inserted for engagement with the key device, said casing having a shutter to be opened to permit entrance of the register, and said register having means to be engaged by said shutter when the register has been fully inserted, to hold such register in its full-inserted position.

In testimony whereof we have signed this specification in the presence of two subscribing witnesses.

CLARENCE C. JOHNSON.
RICHARD M. HOPKINS.

Witnesses:
J. L. HUSMAN,
CATHERINE J. FLEMING.